United States Patent Office 3,558,730
Patented Jan. 26, 1971

3,558,730
AROMATIC HYDROCARBON SEPARATION BY ADSORPTION
Richard W. Neuzil, Downers Grove, Ill., assignor to Universal Oil Products Company, Des Plaines, Ill., a corporation of Delaware
No Drawing. Filed June 24, 1968, Ser. No. 739,176
Int. Cl. C07c 7/12; C10g 25/06
U.S. Cl. 260—674      10 Claims

ABSTRACT OF THE DISCLOSURE

A process for the separation of para-xylene from a mixture of at least one other xylene isomer using a synthetically prepared crystalline aluminosilicate faujasite adsorbent. A feed mixture comprising at least two xylene isomers is passed through a bed of faujasite adsorbent wherein one xylene isomer is preferentially adsorbed within the adsorbent. A desorption step is then used to desorb the adsorbed feed component.

BACKGROUND OF THE INVENTION

Field of the invention

The field of art to which the claimed invention pertains is hydrocarbon separation. More specifically, the claimed invention relates to the separation of aromatic hydrocarbons incorporating a solid adsorbent which selectively removes one aromatic component from the feed. The selectively adsorbed aromatic component is recovered from the solid adsorbent through a desorption step.

Description of the prior art

It is known in the separation art that certain crystalline aluminosilicates can be used to separate individual hydrocarbons from mixtures thereof. In the separation of aromatic hydrocarbons the acidic nature of certain crystalline aluminosilicates can be used in a selected manner to separate a desired component of a mixture of aromatic components. This manner of separation is particularly useful where the components to be separated have similar physical properties such as freezing and boiling points.

In aromatic hydrocarbon separation and in particular xylene separation, the differences in the acidic nature of the xylene isomers coupled with the acidic nature of the selected crystalline aluminosilicate will give a system which will selectively separate a particular xylene from a mixture of xylene isomers.

Mixtures containing substantial quantities of xylene isomers generally are produced by reforming and isomerization processes. In reforming processes a naphtha feed is reformed at severities selected to produce aromatic compounds which can be separated using the method of this invention. Xylene isomerization processes generally isomerize a xylene mixture deficient in one or more isomers to give an effluent containing increased quantities of the desired xylene isomer which also can be separated using the method of this invention.

The equilibrium quantities of the xylene isomers and ethylbenzene are shown at various equilibrium temperatures.

| Temperature, °C | 327 | 427 | 527 |
|---|---|---|---|
| Mole percent of isomer* (including ethylbenzene): | | | |
| Ethylbenzene | 6 | 8 | 11 |
| Para-xylene | 22 | 22 | 21 |
| Meta-xylene | 50 | 48 | 45 |
| Ortho-xylene | 22 | 22 | 23 |

*Based on API sources.

The various processes of producing xylene isomers generally produce effluents which contain equilibrium quantities of ethylbenzene. Since the ethylbenzene boils at about the same temperature as the meta and para-xylene isomers fractionation methods are impractical for separating the ethylbenzene from meta and para-xylene. The ortho-xylene isomer has a boiling point sufficiently higher than ethylbenzene, and para and meta-xylene to allow fractional separation of the ortho-xylene from the remaining $C_8$ aromatic compounds if this is desired.

In adsorptive-separation processes an important factor that is used to determine the ability of a particular adsorbent to separate components of a feed is the selectivity (B) of the adsorbent for one component as compared to another component. The selectivity (B) as used throughout this specification is defined as the ratio of the two components of the adsorbed phase over the ratio of the same two components in the unadsorbed phase at equilibrium conditions. Expressed in equation form:

$$\text{Selectivity} = B = \frac{[\text{vol. percent } C/\text{vol. percent } D]A}{[\text{vol. percent } C/\text{vol. percent } D]U}$$

where C and D are two components of the feed represented in volume percent and the subscripts A and U represent the adsorbed and unadsorbed phases respectively. The equilibrium conditions as defined here were determined when the feed passing over a bed of adsorbent did not change composition after contacting the bed of adsorbent or in other words there was no net transfer of material occurring between the unadsorbed and adsorbed phases.

As can be seen where the selectivity of two components approaches 1.0 there is no preferential adsorption of one component by the adsorbent. As the B becomes less than or greater than 1.0 there is a preferential selectivity by the adsorbent of one component. When comparing the selectivity of component C over component D, a B larger than 1.0 indicates preferential adsorption of component C within the adsorbent. A B less than 1.0 would indicate that component D is preferentially adsorbed leaving an unadsorbed phase richer in component C and an adsorbed phase richer in component D.

In adsorptive-separation processes the separation of para and meta-xylene can be effected through the use of a crystalline aluminosilicate faujasite adsorbent. Common faujasites which can effectively separate the para and meta-xylene isomers are the synthetically prepared calcium and sodium forms. These two faujasites generally have $SiO_2/Al_2O_3$ ratios greater than about 2 and are prepared by methods well known to those familiar in the art of molecular sieve preparation. Reference can be made to the following United States patents for methods of preparation of the faujasite sieves: U.S. Pat. 2,882,243; U.S. Pat. 3,130,007.

When using the sodium or calcium faujasites to separate para and meta-xylene isomers the selectivity of the faujasite is favorable for the adsorption of meta-xylene. For a para-xylene meta-xylene mixture the B of meta-xylene over para-xylene was found to be about 1.33 for a sodium faujasite and about 2.96 for a calcium faujasite. The calcium faujasite because of its higher selectivity would be preferred in an adsorptive-separation type process. Thus it can be seen that where a relatively pure para-xylene stream would be needed as a product from a separation process, a calcium faujasite can be used as the preferred adsorbent giving an adsorbed phase rich in meta-xylene and an unadsorbed phase rich in para-xylene. This type of process would be feasible where the feed stream had previously been subjected to prefractionation steps to remove the higher boiling ortho-xylene.

A problem that occurs when a para-xylene product is desired and ethylbenzene is present with a meta-xylene and para-xylene feed is that the ethylbenzene remains in the unadsorbed phase reducing the para-xylene purity. The selectivity of para-xylene over ethylbenzene for the calcium faujasite was found to be about 1.17 while the same B for the sodium faujasite was found to be about 1.32 which indicates that both the sodium and calcium form faujasites are not capable of satisfactorily separating a para-xylene stream from a mixture of para, meta-xylene and ethylbenzene.

The process of this invention allows separation of para-xylene from mixtures of para, meta-xylene and ethylbenzene through the use of selected ionic exchanged crystalline aluminosilicates which selectively adsorb para-xylene and leave the meta-xylene and ethylbenzene in an unadsorbed phase.

SUMMARY OF THE INVENTION

Objects of the process of this invention are listed below:

(1) It is an object of the present invention to provide a process for the separation of aromatic hydrocarbons through the use of a crystalline aluminosilicate adsorbent.

(2) It is another object of the present invention to provide a process for the separation of para-xylene from a mixture of xylene isomers and ethylbenzene through the use of a selected crystalline aluminosilicate adsorbent.

(3) It is another object of this invention to reduce ethylbenzene contamination of the para-xylene by using a selected crystalline aluminosilicate adsorbent which selectively adsorbs the para-xylene and which does not adsorb substantial quantities of ethylbenzene.

(4) It is another and more specific object of this invention to provide a process for the separation of para-xylene from a mixture of para, meta and ortho-xylene, and ethylbenzene using a faujasite adsorbent which selectively adsorbs para-xylene and which does not adsorb substantial quantities of ethylbenzene and the other xylene isomers.

In the process of the present invention a selected aromatic hydrocarbon is separated from a mixture of aromatic hydrocarbons through the use of a selected crystalline aluminosilicate. In particular a para-xylene isomer is separated from a mixture comprising meta-xylene and ethylbenzene using a selected adsorbent which selectively adsorbs para-xylene leaving other components present in the feed mixture in an unadsorbed raffinate phase.

In testing various adsorbent the selectivity (B) as defined previously was determined using apparatus and procedures as described below. The apparatus used to measure the selectivity of a particular adsorbent consisted of a chamber of approximately 40 cc. volume having inlet and outlet ports at opposite ends of the chamber. The chamber was contained within a temperature controlled heating means and in addition pressure control equipment was used to operate the chamber of a constant predetermined pressure. Attached to the outlet line connected to the outlet of the chamber there was chromatographic analysis equipment which was used to analyze the effluent stream leaving the adsorbent chamber.

The following general procedures were used to determine the B for various adsorbents tested in the chamber. A feed mixture having a known composition was passed through the adsorbent chamber at a regulated pressure and temperature until the effluent composition flowing from the adsorbent chamber remained at a constant composition indicating that there was no net transfer between the adsorbed phase within the adsorbent and the unadsorbed or external phase surrounding the sorbent particles. The feed to the adsorbent chamber was then stopped and all of the unadsorbed material present in the adsorbent chamber was removed by draining the said adsorbent and purging the adsorbent with a gaseous or liquid material if needed. A second mixture containing a hydrocarbon which was able to desorb the previously adsorbed component of the feed from the adsorbent was then passed through the adsorbent chamber. The chromatographic analysis equipment was used to analyze the unadsorbed or external phase and the material desorbed from within the adsorbent. Knowing the compositions of these two streams the B of a particular adsorbent could then be calculated using the definition previously given for selectivity.

In measuring the separation properties of various crystalline aluminosilicates the sodium and calcium form faujasites were found to have the following average B values:

| | B at 127° C. | |
|---|---|---|
| Faujasite | p-Xylene/ m-xylene | p-Xylene/ ethylbenzene |
| Na form | 0.75 | 1.32 |
| Ca form | 0.35 | 1.17 |

The above selectivities are for the faujasites having $SiO_2/Al_2O_3$ ratios greater than about 2.5. As can be noticed, the selectivities above are not favorable for the separation of para-xylene from a mixture containing meta-xylene and ethylbenzene.

When the two faujasites tested above were exchanged with barium or potassium and tested for their adsorption properties there appeared to be an improvement of the crystalline aluminosilicates for para-xylene meta-xylene separation as shown below:

| | B at 127° C. | |
|---|---|---|
| Faujasite | p-Xylene/ m-xylene | p-Xylene/ ethylbenzene |
| Ba form | 1.27 | 1.86 |
| K form | 1.83 | 1.15 |

However, the potassium form faujasite did not seem to be capable of a satisfactory separation of the ethylbenzene from the para-xylene isomer as indicated by the 1.16 value for that particular separation. The sodium and calcium faujasites previously tested were exchanged with both barium and potassium and then subsequently tested for their separation properties as indicated below:

| | B at 127° C. | | |
|---|---|---|---|
| Faujasite | p-Xylene/ m-xylene | p-Xylene/ ethylbenzene | p-Xylene/ o-xylene |
| Ba+K form | 3.35 | 2.32 | 3.11 |
| Ba+K form | 3.76 | 2.10 | |

As can be seen the faujasites exchanged with both barium and potassium were superior to the previously tested adsorbents. In fact that combination of barium and potassium on a faujasite adsorbent provides an adsorbent with selectivities superior to the selectivities of either barium or potassium when used alone. The reason for this unexpected behavior is not known but the results indicate that there is some mutual effect when barium and potassium are both present on a faujasite adsorbent.

The method of preparation of the faujasite adsorbents used in the process of this invention can be found in U.S. Pats. 2,882,243 and 3,130,007. Preparation of preferred faujasite adsorbents should not necessarily be limited to the methods of these two U.S. patents. It is contemplated that both the calcium and sodium type X and Y faujasites can be exchanged with barium and potassium salt solutions to produce preferred adsorbents for the process of this invention.

As is known in the art, the type X crystalline aluminosilicate or faujasite has the following chemical composition of a unit crystal cell:

$0.9 \pm 0.2 M_{2/n}O : Al_2O_3 : 2.5 \pm 0.5 SiO_2 : YH_2O$ wherein "M" represents at least one cation having a valence of not more than three, "n" represents the valence of "M"

and "Y" may be any value up to about 8, the atoms of the faujasite being arranged in a unit all in an orderly crystalline manner. The type Y faujasite has the same crystal structure as type X but has a different chemical composition. The $SiO_2/Al_2O_3$ ratio for the Y type faujasite is higher than the $SiO_2/Al_2O_3$ ratio for the type X faujasite which results in a corresponding reduction in exchangeable metal cations in the type Y faujasite.

The exchangeable metal cations are represented in the above formula by "M" and are generally selected from the group I and II metals from the Periodic Table of the Elements. It is preferred in the process of this invention to use either the X or Y type faujasites which contain barium and potassium as a portion of the exchangeable cation sites.

In replacing the exchangeable cations within a crystalline aluminosilicate with a selected metal cation the generally well-known methods of contacting the aluminosilicate with a solution of the desired cation are used. After the desired degree of ion exchange has taken place the adsorbent is washed and dried to a predetermined degree. The method of replacing the exchangeable cations with both barium and potassium cations can be performed either by ion exchange with a solution of both the barium and potassium salts or by stepwise ion exchange with a solution of one of the cations followed by ion exchange with the other cation. It is preferable to exchange the faujasite in a manner so that substantially all of the exchangeable metal cations originally present in the faujasite are replaced by the barium and potassium ions. This is preferred because of the marked selectivity improvement that is associated with the barium and potassium combination when present on the same adsorbent.

In processes where it is desirable to concentrate a para-xylene stream from a mixture containing the other xylene isomers and ethylbenzene the preferred adsorbent of the present invention can be contacted with the feed mixture without any requirement that the feed be first fractionated to remove ortho-xylene. This additional benefit found to be present when barium and potassium are present jointly on the faujasite is quite apparent when the B for para-xylene over ortho-xylene is measured. Experimental determinations as presented previously in this specification gave an average B for para-xylene over ortho-xylene of about 3.11 which is sufficiently high to allow a relatively efficient separation of the two isomers. Thus the process of this invention using a preferred barium and potassium faujasite adsorbent is suitable for separation of para-xylene from a feed mixture containing the three xylene isomers and ethylbenzene.

It is, in some cases, preferable to concentrate both para-xylene and ortho-xylene product streams from feed mixtures of the three xylene isomers and ethylbenzene. In this case the otho-xylene can be separated from the feed mixture by fractionation methods prior to contacting the feed with the faujasite adsorbent to separate the para-xylene component.

In separating the para-xylene isomer in the process of this invention a bed of solid adsorbent is contacted with a feed mixture, the para-xylene is preferentially adsorbed on the adsorbent, the unadsorbed or raffiniate mixture is removed from the adsorbent bed, and the adsorbed para-xylene is removed from the solid adsorbent. The adsorbent can be contained in a single chamber where, through programmed flow into and out of the chamber, a separation of a para-xylene stream is effected. Swing bed operational technique where a series of adsorbent chambers are available or simulated moving bed countercurrent operations similar to the general pattern of operations as disclosed in U.S. Pat. 2,985,589 can be used. In the latter method of operations the selection of a suitable desorbent requires that it be capable of readily displacing adsorbed para-xylene from the adsorbent and also that the para-xylene in the feed mixture be able to displace adsorbed desorbent from a previous desorption step. This requires that a desorbent used in a simulated moving bed process where there is a continuous transfer of para-xylene and desorbent into and out of the adsorbent have a B, when compared to para-xylene, close to unity and preferably slightly less than unity since mass action effects are used to desorb adsorbed para-xylene with the desorbent when collecting para-xylene product and mass action effects are also used to desorb adsorbed desorbent with para-xylene when the para-xylene is being adsorbed on the adsorbent.

The desorbent used in the process of this invention should be a material that is separable from the mixture that is fed to the solid adsorbent. In desorbing the preferentially adsorbed component of the feed both desorbent and the desorbed feed component are removed from the adsorbent bed in admixture, and without a method of separation of these two materials the purity of the selectively adsorbed component of the feed would not be very high. Therefore, it is contemplated that a desorbent that is of a different boiling range than the feed mixture fed to the solid adsorbent be used in this separation process. The use of a desorbent of a differing boiling range would allow fractionation methods to be used to separate the selectively adsorbed feed component as a relatively pure product stream and allow recovery of the desorbent for possible reuse in the process.

Desorbents which can be used in the process of this invention include benzene, toluene, ethers, alcohols, cyclic dienes and the ketones, all of which as preferred to have lower boiling points than para-xylene. Benzene and toluene are particularly preferred desorbents for use in the process of this invention.

Both liquid and vapor phase operations can be used in the process of this invention. When using liquid phase operations the temperature requirements are somewhat reduced by the use of superatmospheric pressure. Temperature ranges which can be used in adsorption of the preferred xylene isomer within the adsorbent include the range of from about 40° C. to about 200° C. Pressures preferred in the operation of this invention are included in the range of from about atmospheric to about 300 p.s.i.g.

DESCRIPTION OF THT PREFERRED EMBODIMENTS

In accordance with a specific embodiment of the present invention, there is provided a process for separating at least one aromatic hydrocarbon from a feed mixture containing aromatic hydrocarbons, said separation is effected by contacting a crystalline aluminosilicate adsorbent with the mixture and selectively adsorbing within the adsorbent at least one aromatic hydrocarbon from the feed mixture.

In a more specific embodiment there is provided a process for separating a para-xylene isomer from a mixture containing xylene isomers and ethylbenzene, said separation is effected by the use of a faujasite crystalline alumino-silicate adsorbent containing at least one metal from the group of barium and potassium and which selectively adsorbs para-xylene and substantially excludes the other xylene isomers. The unadsorbed phase is withdrawn from the adsorbent bed and a desorbent material is then contacted with the para-xylene containing adsorbent to remove the para-xylene from the adsorbent.

What is claimed:

1. A process for separating a specific xylene isomer from a mixture containing said isomer and at least one other xylene isomer which comprises contacting said mixture with a crystalline aluminosilicate adsorbent having pore diameters of from about 8 to about 15 angstroms and containing both barium and potassium at exchangeable cationic sites within the adsorbent crystalline structure.

2. A process as in claim 1 further characterized in that said adsorbent comprises faujasite.

3. A process as in claim 1 further characterized in that said mixture also comprises ethylbenzene.

4. A process as in claim 3 further characterized in that said specific xylene isomer is para-xylene and the crystalline aluminosilicate is faujasite, the para-xylene being preferentially adsorbed thereby.

5. A process as in claim 3 further characterized in being effected at conditions including a temperature within the range of from about 40° C. to about 200° C. and a pressure within the range of from about atmospheric to about 300 p.s.i.g.

6. A process for separating at least one xylene isomer from a feed mixture comprising xylene isomers and ethylbenzene which comprises the steps of:
  (a) contacting the feed mixture with a bed of solid adsorbent at adsorption conditions to effect the selective adsorption of para-xylene;
  (b) withdrawing from the bed of solid adsorbent a stream comprising a less selectively adsorbed mixture of the feed;
  (c) contacting the adsorbent bed at desorption conditions with a desorbent material to effect the removal of the selectively adsorbed para-xylene from within the adsorbent; and
  (d) withdrawing from the solid adsorbent bed a stream comprising desorbent material and para-xylene;

the process further characterized in that the solid adsorbent comprises faujasite containing both barium and potassium at exchangeable cationic sites within the adsorbent crystalline structure, and the desorbent material boils at a temperature substantially different from the boiling temperature of the selectively adsorbed xylene isomer.

7. A process as in claim 6 further characterized in that a substantial portion of the feed comprises para-xylene, meta-xylene and ethylbenzene.

8. A process as in claim 6 further characterized in that a substantial portion of the feed comprises para-xylene, meta-xylene, ortho-xylene and ethylbenzene.

9. A process as in claim 6 further characterized in that the adsorption conditions include a temperature within the range of from about 40° C. to about 200° C. and a pressure within the range of from about atmospheric to about 300 p.s.i.g.

10. A process as in claim 6 further characterized in that the desorption conditions include a temperature within the range of from about 40° C. to about 200° C. and a pressure within the range of from about atmospheric to about 300 p.s.i.g.

References Cited
UNITED STATES PATENTS

| | | | |
|---|---|---|---|
| 2,882,243 | 4/1959 | Milton | 252—455 |
| 3,114,782 | 12/1963 | Fleck et al. | 260—674 |
| 3,126,425 | 3/1964 | Eberly et al. | 260—674 |
| 3,133,126 | 5/1964 | Fleck et al. | 260—674 |
| 3,130,007 | 4/1964 | Breck | 252—455 |

DELBERT E. GANTZ, Primary Examiner

C. E. SPESSE, JR., Assistant Examiner

U.S. Cl. X.R.

208—310